Jan. 30, 1923.

C. DE CAZEN.
CARBIDE LAMP.
FILED SEPT. 20, 1920.

Inventor
Canaan de Cazen

By
Attorney.

Patented Jan. 30, 1923.

1,443,815

UNITED STATES PATENT OFFICE.

CANAAN DE CAZEN, OF MONTREAL, QUEBEC, CANADA.

CARBIDE LAMP.

Application filed September 20, 1920. Serial No. 411,556.

*To all whom it may concern:*

Be it known that I, CANAAN DE CAZEN, a British subject, residing at #121 Cherrier Street, in the city of Montreal, in the Province of Quebec, in the Dominion of Canada, have invented certain new and useful Improvements in Carbide Lamps; and I do declare that the following is a full, clear, and exact description of the same.

The present invention relates to improvements in carbide lamps or the like, and its main object is to provide a lamp of this character, which will be absolutely safe and particularly convenient to handle, as well as cheap and simple of construction.

Another object of the invention is to provide a lamp, in which the sludge will not be overheated, thus eliminating the danger of explosions.

A further object is to provide a lamp in which the water supply will be automatically cut off when the gas pressure has reached a predetermined point.

The invention will be understood with the aid of the following description and accompanying drawings, in which.

Like numerals of reference indicate corresponding parts.

Referring to the drawings:—

Figure 1:
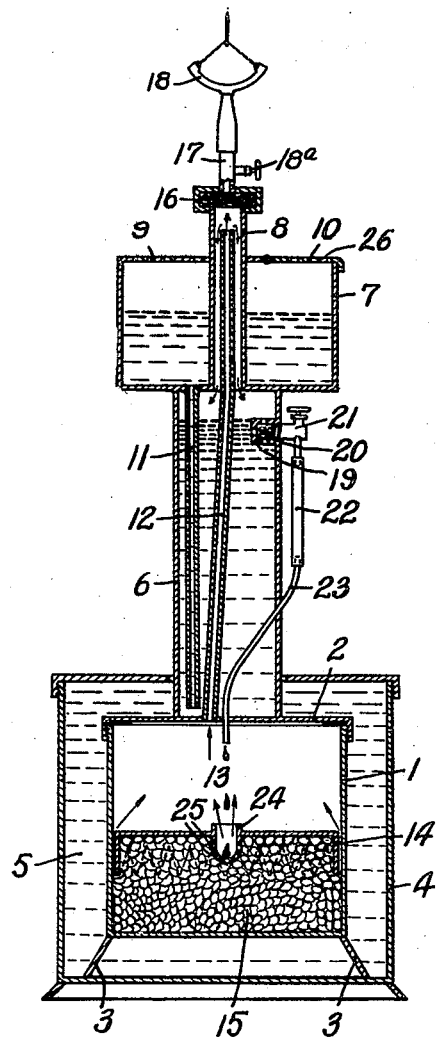
Figure 1 illustrates a vertical sectional view through the lamp, disclosing its inner arrangement.

1 indicates a casing which is preferably circular and which has a cover 2 threaded thereon, said tank or casing being preferably supported on standards 3, and located within a larger casing 4, which contains water, in order to form a cooling water column 5 around said casing 1. The cover 2 has mounted on it a vertical tubular member or chamber 6, which is closed at its lower end by the said cover 2 and suitably secured thereto. At the upper end of the said tubular chamber 6 is provided a circular casing 7, preferably of greater diameter than the tubular chamber 6, said casing 7 being provided with a central and vertical tube 8, which communicates at one end with the tubular chamber 6, and projects at its other end through the top 9 of said casing. The said top 9 of the casing 7 preferably includes a hinged section 10, through which water may be poured in, so that the said casing may thus be regarded as forming a water reservoir. The casing or reservoir 7 is also provided, in the bottom thereof, with a tube 11, which projects within said tubular chamber or member 6, down to a point adjacent the bottom, thus establishing a communication between the reservoir 7 and the tubular member or water chamber 6.

The carbide tank or casing 1 is made to communicate with the tube 8 by means of a tube 12, which is fitted at one end in an opening in cover 2 and projects at its other end a certain distance within said tube 8, above the top of the reservoir 7. The gases which collect in the chamber 13, provided in the casing 1 above the bell shaped member 14 resting over the carbide 15, in the bottom of said casing, will flow through tube 12 into tube 8, and then pass through the felt filter 16 mounted on said tube 8, into the pipe 17 and the burner 18. The pipe 17 is preferably provided with a regulating valve 18$^a$ in order to shut off the supply of gas to the burner when required.

When the reservoir 7 has been filled with water, the water will flow down the tube 11 and enter the tubular chamber 6, which it will fill. The water contained in said reservoir 7 and tubular chamber 6, serves to generate gas, as well as form a water head of sufficient size to keep the gas at a normal pressure, and when there is an extra generation of gas, which is unused, it will naturally collect in the tube or container 8 and will press downward the water in said tube 8 and tubular chamber 6, with the result that the water is forced to rise through pipe 11 into casing 7 which it continues to refill, until a convenient space has been provided for the surplus gas.

In the present invention, the water preferably drops in a sufficient quantity into the carbide 15 located in the bottom of the casing 1. The means used may comprise a perforated casing 19 secured against the inner side of said tubular chamber 6, adjacent its upper end, said casing 19 being provided with suitable filtering means 20, and connected to a valve 21, which projects on the outer side of said tubular chamber 6. To said valve is preferably connected at one end a flexible tube 22, which is connected at its other end to a rigid or stationary tube 23, said tube 23 projecting inwardly into said chamber 6 and through the cover 2 of the casing 1, in order that its lower end may extend over a cup 24 provided with a plurality of holes 25, said cup being secured centrally in said bell member 14. Thus, when the valve 21 is open, the water passing through said tubes 22 and 23 will drop into said cup 24 and escape through the openings or holes 25, into the carbide. When the production of gas is greater than that used, the gas will enter and collect in the tubular container 8 and force the water level down, as previously stated; and if the quantity of gas generated is so great that the water level in the chamber 6 is lowered by the gas pressure to a point below the valve 21, the supply of water will be automatically stopped, thus stopping practically immediately the generation of gas. The water contained in said tube 8 and tubular chamber 6, when forced out, will enter the reservoir 7 through the pipe 11. It will thus be seen that the danger of explosions, due to the accumulation of gas, will be absolutely eliminated, as the gas generation is automatically stopped at a predetermined point. If, by any means, the generation of gas should continue, due to moisture remaining in the carbide after the water has ceased to drop, and an over charge of gas should result therefrom, the gas, to escape, would fizzle slowly through the water head, formed in the reservoir 7, and through the cover 10, which is provided with holes 26 to allow the gas to escape. But this condition should not normally exist, and the water head in the reservoir 7 will be sufficient to prevent the gas from escaping, the result being that the lamp will be absolutely odorless.

Figure 2:
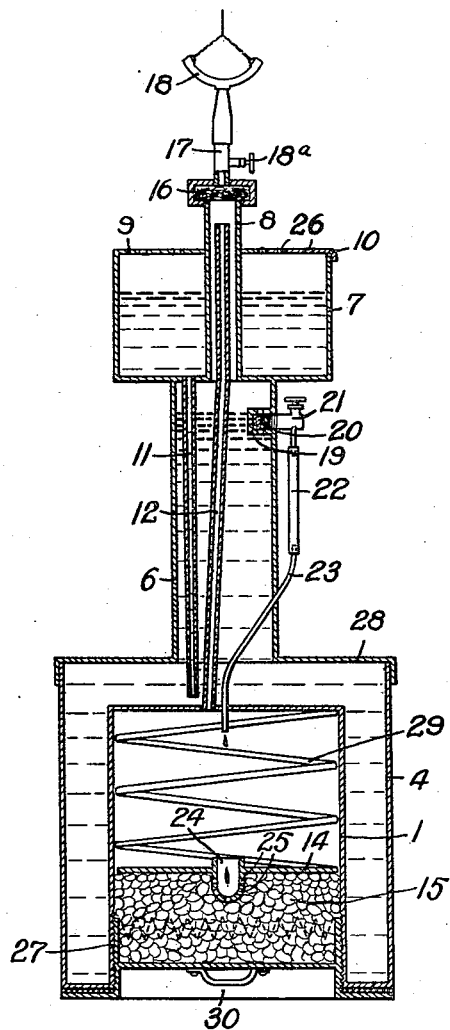
Figure 2 illustrates a vertical sectional view of a modified form of the invention.

In the modified form of lamp disclosed in figure 2 of the drawings, the general construction is similar to that disclosed in Figure 1. The modification consists in inverting the carbide tank or casing 1 in the outer casing 4, and providing a threaded opening 27 in the bottom of the casing 4. The casing 4 is closed at the top by a cover 28 which is secured to the tubular chamber 6, said chamber communicating with said casing 4. The pipe 12 is connected and communicates with the carbide tank 1, and the water pipe 23 enters the said carbide tank as in Figure 1.

In this form of the invention, the member 14 has no depending sides but is merely a disk which is pressed downwardly against the carbide by a spring 29. The carbide is contained in a cap or cover 30 which threads in the threaded opening 27.

It will readily be seen that in the modification, the carbide tank or casing 1 will be provided with a water jacket similar to that shown in the first form of the invention, and that none of the other alterations in form constitutes a departure from the spirit and scope of the present invention.

The tube 22 above referred to should be of flexible material and detachable from the valve 21 and tube 23, in order that if the valve or any part of the tube should clog with dirt, it can easily be cleaned by blowing therein. The said tube 22 can also be made of glass of any other transparent material, so as to facilitate the regulating of the water supply, which can be observed through the transparent tube.

What I claim as my invention is:—

1. In an acetylene gas generator, the combination of a carbide tank; a plate adapted to rest therein on top of the carbide and provided with a perforated, cup-shaped depression; and a water supply pipe having its outlet disposed directly over said depression to drop water thereinto.

2. In an acetylene gas generator, the combination of a carbide tank; a plate adapted to rest therein on top of the carbide and provided with a perforated, cup-shaped depression, said plate being spaced from the top wall of the tank to provide a gas-generating chamber; a water supply pipe having its outlet end extending through said top wall and terminating immediately above said depression to drop water thereinto; and a gas delivery pipe connected to and opening through the said top wall.

3. In an acetylene gas generator, the combination of a carbide tank; a tubular water chamber mounted above said tank but devoid of direct communication therewith, said chamber having an outlet opening adjacent its upper end; a valve for controlling said opening located exteriorly of said chamber; a water-supply pipe connection between said valve and said tank having its upper portion disposed exteriorly of said chamber and its lower portion interiorly thereof, the last-named portion extending through the bottom of said chamber into the upper portion of the carbide tank; and a gas delivery pipe leading from said tank.

4. In an acetylene gas generator, the combination of an outer water tank; an inner carbide tank adapted to be completely submerged in water in the water tank but devoid of communication therewith, to prevent the entrance of water from the water tank into the carbide tank; a tubular water chamber mounted above the carbide tank and also devoid of communication with the water tank; means for supplying water from the water chamber to the carbide tank; and a gas delivery pipe leading from said carbide tank.

Signed at Montreal, Quebec, Canada, this 9th day of September 1920.

CANAAN DE CAZEN.

Witnesses:
C. PATENAUDE,
G. BEAUDOIN.